United States Patent
Pire et al.

(10) Patent No.: US 9,984,581 B2
(45) Date of Patent: May 29, 2018

(54) METHOD AND A SYSTEM FOR ASSISTING PILOTING TO AVOID AN OBSTACLE WITH A ROTORCRAFT

(71) Applicant: AIRBUS HELICOPTERS, Marignane (FR)

(72) Inventors: Richard Pire, Istres (FR); Marianne Gillet, Vitrolles (FR); Nicolas Certain, Aix en Provence (FR)

(73) Assignee: AIRBUS HELICOPTERS, Marignane (FR)

(*) Notice: Subject to any disclaimer, the term of this patent is extended or adjusted under 35 U.S.C. 154(b) by 56 days.

(21) Appl. No.: 15/162,752

(22) Filed: May 24, 2016

(65) Prior Publication Data
US 2016/0351060 A1   Dec. 1, 2016

(30) Foreign Application Priority Data
May 29, 2015  (FR) .................................. 15 01118

(51) Int. Cl.
*G08G 5/04*  (2006.01)
*B64D 45/08*  (2006.01)
(Continued)

(52) U.S. Cl.
CPC ............. *G08G 5/045* (2013.01); *B64D 45/08* (2013.01); *G01C 23/005* (2013.01);
(Continued)

(58) Field of Classification Search
None
See application file for complete search history.

(56) References Cited

U.S. PATENT DOCUMENTS 5,781,126 A * 7/1998 Paterson .............. G05D 1/0607
                                                   244/17.11
7,499,773 B2 * 3/2009 Pire ......................... G01S 13/94
                                                      340/970
(Continued)

FOREIGN PATENT DOCUMENTS

FR    2932919    12/2009
FR    3008530    1/2015

OTHER PUBLICATIONS

French Search Report for French Application No. FR 1501118, Completed by the French Patent Office dated Apr. 14, 2016, 11 Pages.

*Primary Examiner* — Redhwan K Mawari
*Assistant Examiner* — Edward Torchinsky
(74) *Attorney, Agent, or Firm* — Brooks Kushman P.C.

(57) ABSTRACT

A piloting assistance method for avoiding an obstacle with a rotorcraft flying along a current speed vector (Vect0). An alert is generated by using a speed vector of the rotorcraft referred to as a "calculation" speed vector (Vect1) in order to determine whether the rotorcraft might impact an obstacle. During a correction stage and at each calculation iteration, the calculation speed vector (Vect1) is determined using a horizontal component and a vertical component, the vertical component being a function of a current vertical speed of the rotorcraft relative to the ground corrected with a corrective term, the corrective term being a function of a product of a current path speed of the rotorcraft multiplied by the derivative of the path speed.

18 Claims, 2 Drawing Sheets

(51) Int. Cl.
*G08G 5/00* (2006.01)
*G01C 23/00* (2006.01)

(52) U.S. Cl.
CPC ......... *G08G 5/0021* (2013.01); *G08G 5/0052* (2013.01); *G08G 5/0086* (2013.01)

(56) References Cited

U.S. PATENT DOCUMENTS

| | | | |
|---|---|---|---|
| 7,616,130 B2 * | 11/2009 | Astruc | G01C 23/005 244/17.11 |
| 7,791,529 B2 * | 9/2010 | Filias | G01C 21/16 342/104 |
| 7,941,250 B2 * | 5/2011 | Certain | G01P 3/50 340/945 |
| 8,249,799 B2 | 8/2012 | Flotte et al. | |
| 8,547,252 B2 | 10/2013 | Germanetti et al. | |
| 9,199,744 B2 | 12/2015 | Petillon | |
| 2002/0030610 A1 | 3/2002 | Ishihara et al. | |
| 2002/0126040 A1 | 9/2002 | Block | |
| 2015/0266591 A1 * | 9/2015 | Petillon | B64C 27/56 701/11 |
| 2016/0351060 A1 * | 12/2016 | Pire | B64D 45/08 |

\* cited by examiner

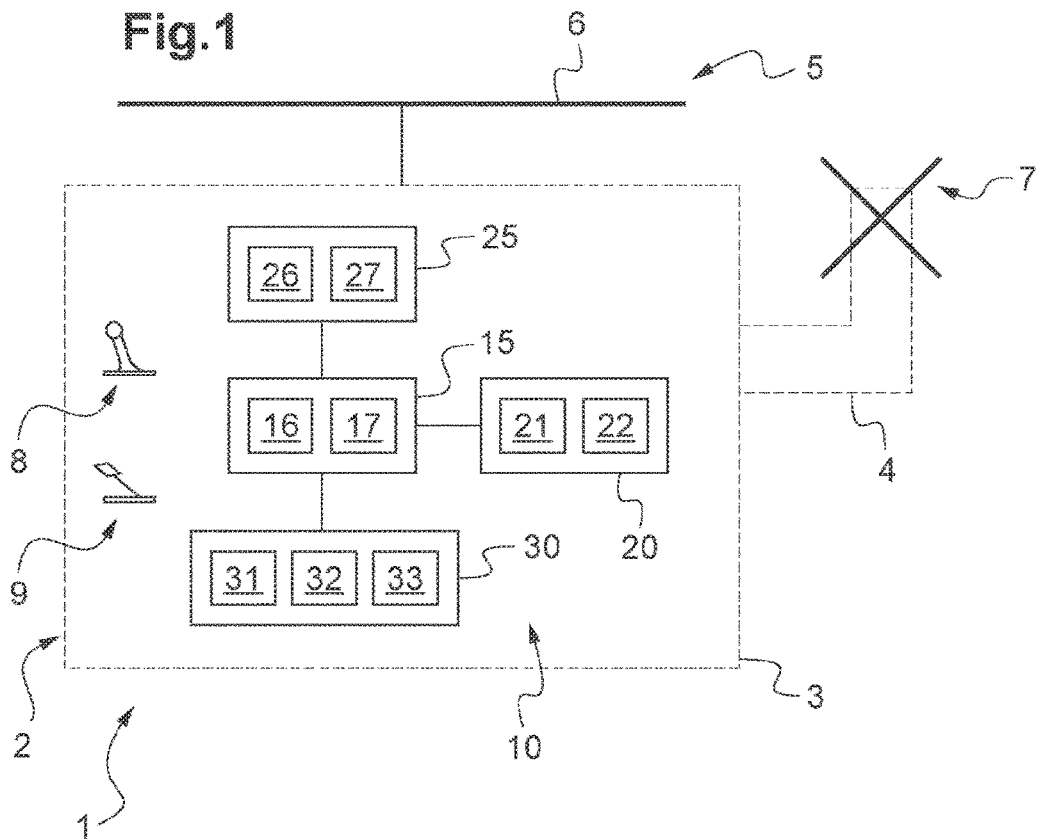
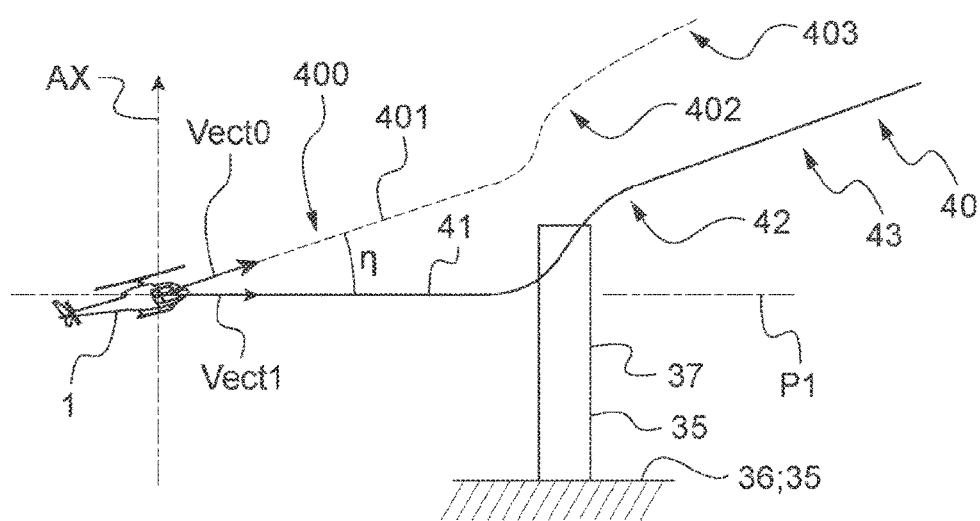

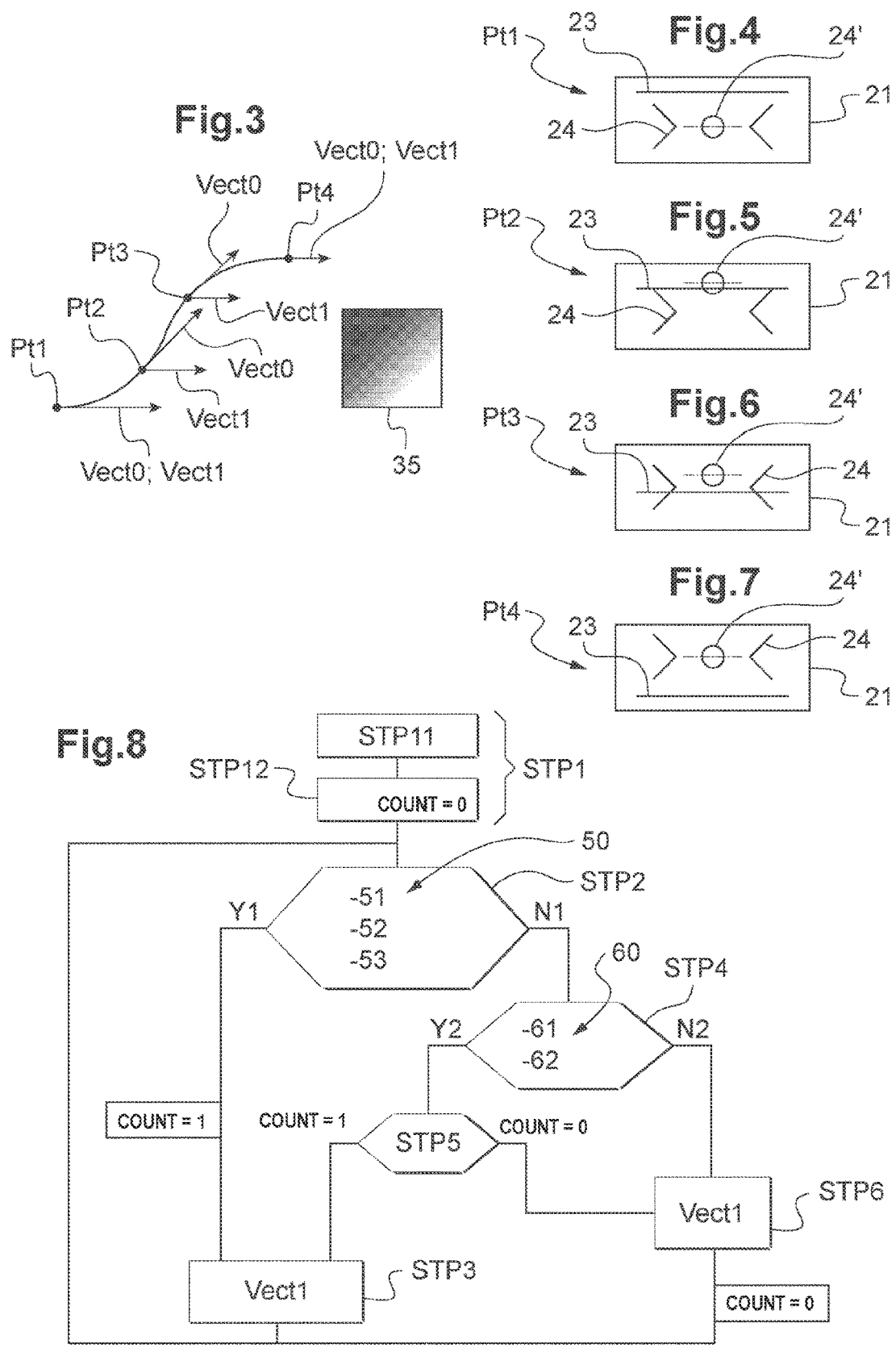

METHOD AND A SYSTEM FOR ASSISTING PILOTING TO AVOID AN OBSTACLE WITH A ROTORCRAFT

CROSS REFERENCE TO RELATED APPLICATION

This application claims priority to French patent application No. FR 15 01118 filed on May 29, 2015, the disclosure of which is incorporated in its entirety by reference herein.

BACKGROUND OF THE INVENTION (1) Field of the Invention

The present invention relates to a method and to a system for assisting piloting in order to avoid an obstacle with a rotorcraft, and it also relates to a rotorcraft implementing the method.

(2) Description of Related Art

A rotorcraft has a rotary wing provided with a rotor. The rotor contributes at least in part to providing the aircraft with lift, and possibly to providing the aircraft with propulsion.

The invention relates to the general technical field of assisting in the piloting of rotorcraft, and in particular to the fields of alerts for avoiding obstacles. The present invention relates more particularly to a method of issuing an alert in order to enable a rotary wing aircraft to avoid an obstacle, and also to a device implementing the method, and to an aircraft having such a device.

The term "obstacle" is used broadly. The term obstacle applies equally well to natural obstacles, i.e. the terrain being overflown, and to obstacles that are not natural, e.g. such as a building or a cable. The term "obstacle" in isolation thus refers to any item that might impact against the aircraft.

Such systems for assisting piloting by issuing an alert to avoid an obstacle are known as terrain avoidance warning systems (TAWS).

Such TAWS piloting assistance systems serve to indicate dangerous obstacles ahead of the aircraft on its path, while they are being approached. Such TAWS piloting assistance systems include in particular an obstacle avoidance function known as forward-looking terrain avoidance (FLTA). Using the FLTA avoidance function, a TAWS piloting assistance system may seek, for example, to prevent an aircraft hitting the ground without causing the pilot at the controls to lose control, in particular as a result of a navigation error or indeed by misjudging the height of relief being overflown or of non-natural obstacles, if any.

Another system is known as a ground proximity warning system (GPWS), serving to alert the pilot of the aircraft that the ground is getting closer.

All of these systems have been designed mainly for airplanes and they are not necessarily suitable or satisfactory for rotorcraft. A rotorcraft is capable of performing numerous different types of flight, in comparison with a fixed wing aircraft such as an airplane. Only cruising flights of a rotorcraft are genuinely comparable with airplane flights. An aircraft can also hover, or fly only vertically, or only sideways. Furthermore, a rotorcraft can fly for long periods of time very close to the ground and obstacles that are not natural.

During such flights, the parameters that are taken into consideration and the alerts that are issued by a terrain avoidance system designed for an airplane are not appropriate, and possibly even undesirable, and they can constitute a nuisance for the pilot.

Furthermore, the piloting controls of a rotary wing aircraft are different from those of an airplane, so performing an avoidance maneuver requires specific piloting actions that are different from those applicable to airplanes.

Given this observation, systems for assisting piloting by using an alert in order to avoid terrain have been adapted for rotorcraft and they are known as helicopter terrain avoidance warning systems (HTAWS).

An HTAWS piloting assistance system can act for example to determine an avoidance path for the aircraft with the help of flight data. On each calculation iteration performed by the system, the avoidance path conventionally includes a segment extending from the aircraft along the current speed vector of the aircraft.

The term "current speed vector" refers to the speed vector of the aircraft at the moment the calculation iteration is performed.

Furthermore, such an HTAWS piloting assistance system can evaluate whether the avoidance path runs the risk of leading the aircraft towards an obstacle. If so, a so-called "terrain" alarm is triggered.

A rotorcraft, and in particular a helicopter, is provided with a lift rotor. On board a helicopter, a lift rotor contributes at least in part to propelling the aircraft. Such a rotor is sometimes referred to as a "main" rotor.

Modifying the cyclic pitch of the blades of the main rotor tends to tilt the speed vector of the rotorcraft.

In order to control a rotorcraft, a pilot can thus operate a cyclic pitch stick in order to act on the cyclic pitch of the blades or the main rotor.

Furthermore, a pilot can operate a collective pitch lever in order to act on the collective pitch of the blades of the main rotor.

A modification to the collective pitch causes the rotorcraft to move down or up.

In order to avoid an obstacle such as a mountain, for example, a pilot can make use of a resource by operating the cyclic pitch stick. The resource that is available is physically limited by the load factor that the aircraft can accept.

The resource thus leads to the current speed vector of the aircraft tilting, and consequently to the avoidance path prepared by the piloting assistance system tilting.

Specifically, the avoidance path is modified as a result of the resource and conventionally it tends to move suddenly upwards. This avoidance path might then reach a point that is situated above the obstacle.

Under such circumstances, certain THAWS piloting assistance systems consider that the aircraft is out of danger relative to the obstacle that is to be avoided. Nevertheless, the aircraft is still in danger so long as the aircraft is not actually above the obstacle to be avoided and independently of its current speed vector. Under such conditions, the piloting assistance system runs the risk of not generating an alert even though the aircraft is not entirely safe.

The object of the invention is to deliver a "terrain" alarm representative of the energy balance of the rotorcraft in order to avoid such a situation.

Document FR 3 008 530 describes an HTAWS type piloting assistance system that calculates a sheet of avoidance paths. Each avoidance path includes a preliminary stage during which the pilot has not yet reacted, and thus during which the avoidance path is purely an extension of the current path and thus of the current speed vector.

Document FR 2 932 919 describes a terrain alert system that takes account of the instantaneous maneuverability of the aircraft, and in particular its instantaneous mass and vertical acceleration. An avoidance path is then prepared and is constituted by a substantially rectilinear proximal segment representative of a transfer time together with at least one distal segment of conical profile. The proximal segment then extends the path being followed, i.e. the direction of the current speed vector of the aircraft.

Document US 2002/0030610 describes a method that describes an angle of the current speed vector relative to the horizontal in order to calculate an alarm.

Document US 2002/0126040 proposes using an extension to the current path in order to present different levels of terrain in different colors on a screen.

Document U.S. Pat. No. 8,249,799 proposes using an extension of a current path in order to determine whether an obstacle is dangerous.

Document U.S. Pat. No. 7,941,250 is remote from the field of the invention. This document is mentioned solely by way of information and it relates to calculating a predicted vertical speed.

Document U.S. Pat. No. 5,781,126 is also known.

BRIEF SUMMARY OF THE INVENTION

An object of the present invention is thus to propose an alternative method of assisting the piloting of a rotorcraft that seeks to make flight safe, in particular as a result of a resource that is implemented by modifying the cyclic pitch of the blades of a rotor.

The invention thus relates to a piloting assistance method for avoiding an obstacle with a rotorcraft flying along a current speed vector, an alert being generated if an obstacle might be impacted by the rotorcraft. Such an alert may be an alert that can be seen and/or be heard and/or be felt.

The alert is generated by using a speed vector of the rotorcraft, referred to for convenience as the "calculation" speed vector, in order to determine whether the rotorcraft is running a risk of impacting an obstacle, and the method includes a correction stage that is applicable under predetermined conditions.

The method may have only one single correction stage. Nevertheless, other stages are also possible, and in particular a non-corrected stage, as described below.

During the correction stage and on each calculation iteration, the calculation speed vector is determined using a horizontal component of the calculation speed vector in a horizontal plane orthogonal to gravity direction and a vertical component of the calculation speed vector in said gravity direction, the vertical component being a function of a current vertical speed of the rotorcraft relative to the ground at said calculation instant, the current vertical speed being corrected with a corrective term, said corrective term being a function of a product of a current path speed of the rotorcraft multiplied by the derivative of the path speed. The horizontal component is thus situated on a horizontal axis passing via the orthogonal projection of the current speed vector onto the horizontal plane.

The term "current" refers to the calculation iteration that is being processed.

The current vertical speed corresponds to an upward or downward speed of the rotorcraft relative to the ground.

The current path speed is equal to the modulus of the current speed vector of the rotorcraft relative to the ground.

Conventional piloting assistance systems determine a potential impact in order to generate an alert as a function of the path being followed. Some conventional piloting assistance systems do not take account of the specific features of a rotorcraft rotor and in particular of the possibility available to a pilot of modifying the path of the rotorcraft by modifying the collective pitch and/or the cyclic pitch of the blades of such a rotor.

Thus, after a resource has been used to modify the cyclic pitch of the blades of the rotor, certain conventional piloting assistance systems can fail to generate an alert even though the rotorcraft is still in a potentially dangerous situation that might require a modification to the collective pitch of the blades.

By using the corrective term, the invention seeks to deliver an alert that is more representative of the power balance of the rotorcraft independently of spot transfers of energy (kinetic energy into potential energy) as a result of using a resource.

At least in certain situations, the method of the invention proposes using not a current speed vector for determining whether an alert should be issued, but rather a calculation speed vector corresponding to the current speed vector as corrected. This calculation speed vector, and in particular its horizontal and vertical components, is used by a piloting assistance system, e.g. by a conventional piloting assistance system. In particular, the calculation speed vector makes it possible to position a proximal segment of an avoidance path or a ground route angle.

During the correction stage, using the calculation speed vector instead of the current speed vector gives a better representation of the upward avoidance maneuver of the rotorcraft when the resource is used by modifying the cyclic pitch of the blades of the rotor. This calculation speed vector represents a kind of predictive speed vector making it possible to optimize the generation of an obstacle alert after making use of a resource of the aircraft.

The method may also include one or more of the following characteristics.

Thus, the horizontal component of the calculation speed vector may for example be equal to a current horizontal speed of the rotorcraft relative to the ground.

The calculation speed vector is representative of the ground speed, at least on a horizontal plane perpendicular to gravity direction.

Furthermore, the vertical component of the calculation speed vector may be determined using the following relationship:

$$V2 = Vv + Vvp \text{ with } Vvp = B * \frac{Vt}{g} * \frac{dVt}{dt}$$

where "V2" represents said vertical component, "Vv" represents the current vertical speed relative to the ground, "Vvp" represents the corrective term, "B" represents a constant, "Vt" represents the current path speed, $$"\frac{dVt}{dt}"$$

represents the time derivative of the path speed, "g" represents the acceleration due to gravity, "*" represents the multiplication sign, and "+" represents the addition sign.

The current horizontal speed, the current vertical speed, the current path speed, and the derivative of the path speed can be measured using an inertial unit, and in particular an inertial unit hybridized with a positioning system known as the global positioning system (GPS).

An accelerometer may optionally be used for determining the derivative of the path speed.

Filters may be applied to the various speeds and accelerations in order to eliminate measurement noise.

Optionally, the constant B is less than or equal to 1, and for example it may be equal to 0.5.

The constant B is determined in piloted simulation or in flight testing in order to limit undue alerts.

Furthermore, the method may be initiated when the air speed of the rotorcraft is greater than a difference between a best rate of climb and a margin. Such a margin may be less than or equal to 20 knots.

It should be recalled that one knot corresponds to one nautical mile per hour, i.e. 1.852 kilometers per hour or 0.514 meters per second.

The best rate of climb is represented by the reference Vy by the person skilled in the art.

The air speed may be a speed known as the "true" air speed or a speed known as the "indicated" air speed.

The true air speed (TAS) of an aircraft represents the speed of the aircraft relative to air. This true air speed can be measured with an air data computer.

The indicated air speed (IAS) of an aircraft represents the air speed as indicated by air measurement instrumentation of an aircraft as corrected for the effect of compressibility under standard atmospheric conditions at sea level, but not corrected for errors in the air instrumentation circuit.

Initiating the method as a function of the value of air speed seeks to avoid implementing the method during stages of landing and takeoff.

Optionally, when the air speed decreases and drops below said difference, application of the method may be maintained or stopped.

Furthermore, the current speed vector of the rotorcraft relative to the ground presents an angle with said horizontal plane, and the correction stage is performed if a plurality of criteria are satisfied, said plurality of criteria comprising at least:

a first criterion that is satisfied if a time derivative of said angle is positive; and a second criterion that is satisfied if a time derivative of the path speed is negative.

This characteristic seeks to identify the beginning of a stage of using a resource. Consequently, the manufacturer draws up a list of criteria, this list including at least the above-mentioned first and second criteria. The correction stage then begins if each criterion is satisfied.

In order to detect a stage of using a resource more accurately, said first criterion is satisfied if said time derivative of said angle is greater than a predetermined non-zero constant for a predetermined duration.

In a variant, said plurality of criteria include a third criterion, the third criterion being satisfied if the current vertical speed of the rotorcraft relative to the ground is positive.

Thereafter, three variants are possible, for example.

In a first variant, the correction stage is implemented if the time derivative of said angle is positive and if the time derivative of the path speed is negative.

In a second variant, the correction stage is implemented if the time derivative of said angle is greater than a predetermined non-zero constant for more than a predetermined duration, and if the time derivative of the path speed is negative.

In a third variant, the correction stage is implemented if the time derivative of said angle is greater than a predetermined non-zero constant over a predetermined duration and if the time derivative of the path speed is negative and if the current vertical speed of the rotorcraft relative to the ground is positive.

Furthermore, if at least one criterion is not satisfied, it may be determined whether at least one condition is satisfied, said at least one condition comprising a first condition that is satisfied if a time derivative of the path speed is negative, and if each condition is satisfied:

if said correction stage was implemented in the calculation iteration preceding said current calculation iteration, then said correction stage is implemented during the current calculation iteration; and if said correction stage was not implemented in the calculation iteration preceding said current calculation iteration, then a non-corrected stage is implemented, during which non-corrected stage and on each calculation iteration said calculation speed vector is determined using said horizontal component and a vertical component equal to the current vertical speed of the rotorcraft relative to the ground.

When the stage of using a resource has been initiated, the method suggests evaluating the position of the rotorcraft on the basis of predetermined conditions. If the conditions are satisfied, the rotorcraft is still on an avoidance path. The correction stage is therefore maintained. Otherwise, a non-corrected stage may be implemented.

Furthermore, said at least one condition may include a second condition that is satisfied if a current vertical speed of the rotorcraft relative to the ground is positive.

In addition, if at least one condition is not satisfied, the non-corrected stage may be implemented.

In another aspect, said alert comprises an alarm telling a pilot to change a collective pitch of blades of a rotor of the rotorcraft that is contributing at least to providing the rotorcraft with lift.

If use of the resource has been initiated by modifying the cyclic pitch of the blades of a rotor, the alert is a sound and/or visual alarm in order to specify that the collective pitch of the blades of the rotor needs to be modified in order to make the rotorcraft safe.

Furthermore, in order to evaluate whether an alert needs to be generated, it is possible to determine an avoidance path including at least a proximal segment, the proximal segment extending in a direction followed by the calculation speed vector.

For example, the teaching of Document FR 3 008 530 or of Document FR 2 932 919 may be followed.

The calculation speed vector may also be used by making use of the teaching of Document US 2002/0030610, it being possible for this calculation speed vector to be used in determining a flight path angle (FPA) as mentioned in that document.

The calculation speed vector may also be used in application of the teaching of Document US 2002/0126040, with the extension of the path for coloring the terrain possibly being formed on the basis of the calculation speed vector of the present invention instead of the current speed vector.

In addition to the method, the invention proposes a piloting assistance system.

This piloting assistance system comprises a processor unit connected to an alert unit and to a locator system and to a speed measurement system, the locator system being suitable for locating at least one obstacle, the speed measurement system being suitable for determining information relating to at least one current vertical speed of the rotorcraft and a current path speed of the rotorcraft, said processor unit applying the method of the invention.

For example, the processor unit includes a processor or the equivalent that executes instructions stored in a memory unit in order to apply the method.

In addition, the locator system may comprise at least one of the following pieces of equipment: an obstacle database listing obstacles, and an obstacle detection system.

Furthermore, the speed measurement system may comprise at least one of the following pieces of equipment: an inertial unit, an air data computer, an accelerometer.

Finally, the invention provides a rotorcraft including such a piloting assistance system.

BRIEF DESCRIPTION OF THE SEVERAL VIEWS OF THE DRAWINGS

The invention and its advantages appear in greater detail from the context of the following description of examples given by way of illustration with reference to the accompanying figures, in which:

FIG. 1 is a diagram showing an aircraft of the invention;

FIG. 2 is a diagram showing a calculation speed vector being taken into account that is different from the current speed vector during a correction stage;

FIGS. 3 to 7 are diagrams showing the difference between the invention and certain prior art devices; and FIG. 8 is a diagram showing the method of the invention as an algorithm.

DETAILED DESCRIPTION OF THE INVENTION

Elements present in more than one of the figures are given the same references in each of them.

FIG. 1 shows a rotorcraft 1 of the invention.

The rotorcraft 1 includes an airframe 2.

The airframe 2 has a front portion 3. The front portion carries at least one "main" rotor 5. Each main rotor 5 contributes at least to providing the rotorcraft with lift and possibly also with propulsion.

The airframe may have a rear portion 4 that carries a rotor referred to for convenience as a "secondary" rotor 7. The secondary rotor may contribute to controlling the yaw movement of the rotorcraft.

The main rotor 5 may have a plurality of blades 6. Under such circumstances, the rotorcraft may be provided by way of example with a member 8 for controlling the cyclic pitch of the blades 6 of the main rotor, such as a stick referred to as the "cyclic pitch" stick. Furthermore, the rotorcraft may be provided by way of example with a member 9 for controlling the collective pitch of the blades 6 of the main rotor, such as a lever referred to as the "collective pitch" lever.

Furthermore, the rotorcraft 1 has a piloting assistance system 10 for applying the method of the invention.

The piloting assistance system 10 comprises a processor unit 15. For example, the processor unit 15 possesses a computer 16, such as a computer 16 having at least one processor or the equivalent. Furthermore, the processor unit 15 is provided with a memory unit 17, such as a memory unit comprising one or more memories.

The processor unit 15 is connected to an alert unit 20. The processor unit transmits information to the alert unit 20 in order to generate an alert, if necessary. The alert unit 20 may include at least one display 21 suitable for displaying at least one alert and/or at least one sound broadcast means 22 for issuing an audible alarm.

The alert unit 20 and the processor unit 15 may form part of a single piece of avionics equipment.

Furthermore, the processor unit 15 is connected to a conventional locator system 25 serving to locate natural and/or non-natural obstacles.

Under such circumstances, the locator system 25 may include at least one obstacle database 26. For example, the locator system 25 is provided either with a database of non-natural obstacles containing information representing obstacles situated above the terrain and/or a terrain database containing information representing the terrain being overflown, or else a database containing information representing both the terrain being overflown and also obstacles situated above the terrain.

Furthermore, the locator system 25 may include an obstacle detector system 27, e.g. such as a radar.

Furthermore, the processor unit is connected to a speed measurement system 30 that determines information relating to at least a current vertical speed Vv of the rotorcraft 1 relative to ground and a current path speed Vt of the rotorcraft 1.

The speed measurement system 30 may include at least one of the following pieces of equipment: an inertial unit 31, an air data computer 32, and an accelerometer 33.

By way of example, the measurement system 30 may use the inertial unit to determine the current horizontal speed Vh relative to the ground, the current vertical speed Vv relative to the ground, the current path speed Vt, and the derivative $$\frac{dVt}{dt}$$

of the path speed Vt, and an angle η extending between the current speed vector and a horizontal plane perpendicular to the gravity direction acting on the center of gravity of the aircraft. The current path speed Vt represents the modulus of the speed vector of the rotorcraft relative to the ground.

Furthermore, the measurement system 30 may determine the (true or indicated) air speed of the rotorcraft 1 using the air data computer 32.

Finally, the measurement system 30 may use the accelerometer to determine the time derivative $$\frac{dVt}{dt}$$

of the path speed.

The piloting assistance system 10 enables the method of the invention to be applied.

With reference to FIG. 1, a piloting assistance system is used in flight to avoid an obstacle, such as a non-natural obstacle 37 standing on terrain 36.

For example, a conventional piloting assistance system determines an avoidance path 400 having a proximal segment 401, a resource segment 402, and a distal segment 403.

The proximal segment 401 represents a warning period necessary for a pilot to perform a maneuver. This proximal segment is then situated in line with the current speed vector Vect0 of the rotorcraft 1 relative to the ground. This current speed vector Vect0 presents an angle referred to as the angle "η" relative to a horizontal plane P1. By way of example, the horizontal plane contains the center of gravity of the aircraft and is orthogonal to gravity AX direction at the center of gravity.

If the avoidance path impacts an obstacle, then the piloting assistance system issues a visual and/or audible alert.

In the method of the invention, the alert is generated by the piloting assistance system 10 as a function of a calculation speed vector Vect1.

During a possible non-corrected stage, the calculation speed vector Vect1 coincides with the current speed vector Vect0.

In contrast, during a correction stage as shown in FIG. 2, the calculation speed vector Vect1 is different from the current speed vector Vect0.

During such a correction stage, and on each calculation iteration, the calculation speed vector Vect1 is determined by the processor unit. This calculation speed vector Vect1 possesses a horizontal component V1 in the horizontal plane P1 and a vertical component V2 in the gravity direction AX. More precisely, the horizontal component V1 extends along a horizontal axis, with a projection of the current speed vector onto the horizontal plane being situated on said horizontal axis.

The horizontal component V1 of the calculation speed vector Vect1 may for example be equal to the current horizontal speed Vh of the rotorcraft relative to the ground. This current horizontal speed Vh is determined by the measurement system 30 or by the processor unit using information transmitted by the measurement system 30.

In addition, the vertical component V2 of the calculation speed vector Vect1 is a function of the current vertical speed Vv of the rotorcraft 1 relative to the ground at each calculation instant and of a corrective term Vvp. This corrective term Vvp is then a function of the product of the current path speed Vt of the rotorcraft multiplied by the derivative of the path speed.

In particular, the vertical component V2 is determined using the following relationship:

$$V2 = Vv + Vvp \text{ with}$$
$$Vvp = B * \frac{Vt}{g} * \frac{dVt}{dt}$$

where "Vv" represents the current vertical speed relative to the ground, "Vvp" represents the corrective term, "B" represents a constant, "Vt" represents the current path speed, $$\text{"}\frac{dVt}{dt}\text{"}$$

represents the derivative of the path speed, "g" represents the acceleration due to gravity, "*" represents the multiplication sign, and "+" represents the addition sign.

The constant B is less than or equal to 1, e.g. it is equal to 0.5.

The calculation speed vector Vect1 is then used by methods that are known to the piloting assistance system. For example, the piloting assistance system 10 determines an avoidance path 40 having a proximal segment 41, a resource segment 42, and a distal segment 43, by applying known teaching.

Nevertheless, in the invention, the proximal segment 42 extends the calculation speed vector Vect1.

The piloting assistance system generates an alert as a function of the direction of the calculation speed vector Vect1. For example, an alarm tells the pilot to change the collective pitch of the blades of each main rotor 5 if the avoidance path 40 extending the calculation speed vector Vect1 impacts an obstacle 35.

FIGS. 3 to 7 show the advantage of the invention compared with a prior art system.

FIG. 3 shows in particular a rotorcraft 1 positioned at a plurality of different points Pt1, Pt2, Pt3, Pt4 facing an obstacle 35.

At the first point Pt1 and with reference to FIG. 4, the alert unit of the invention can display the calculation speed vector Vect1 by means of a first symbol 24. This calculation speed Vect1 is located at the same location as a second symbol 24' illustrating the current speed vector Vect0 as used in the prior art.

In addition, the processor unit can display a third symbol 23 presenting the top of the obstacle 35 that is to be avoided. Under such circumstances, the processor unit can also request the emission of a sound alarm by using the sound broadcast means 22.

The obstacle is above the calculation speed vector, suggesting an upward avoidance maneuver. The pilot therefore controls the aircraft in order to make use of a resource.

At the second point Pt2 and with reference to FIG. 5, a resource is applied urgently by changing the cyclic pitch of the blades of each main rotor 5.

The second symbol 24' illustrating the current speed vector rises quickly and passes above the third symbol. Nevertheless, the rotorcraft is not yet completely safe.

In contrast, the first symbol representing the calculation speed vector 24 rises in association with the increase in potential energy and remains below the third symbol 23.

At the third point Pt3 and with reference to FIG. 6, the first symbol representing the calculation speed vector 24 continues to make progress and passes above the third symbol.

In FIG. 3, it can be seen that the aircraft is then situated in a plane that is itself situated above the obstacle 35.

Finally, at the fourth pint Pt4, and with reference to FIG. 7, the resource has terminated. The obstacle 35 has been passed with sufficient guard height.

FIG. 8 displays the method for determining the calculation speed vector Vect1 that is used for generating an alert, where necessary.

The method may include an optical preliminary step STP1.

During an initiation step STP11 of the preliminary step STP1, the processor unit determines whether the method of the invention needs to be initiated.

Under such circumstances, the processor unit 15 compares the (true or indicated) air speed (TAS or IAS) with a difference DIFF. The difference DIFF is equal to the speed of the best rate of climb Vy minus a speed margin Vm of the rotorcraft 1, i.e.:

$$\text{DIFF} = Vy - Vm$$

For example, the margin is equal to 20 knots.

If the air speed (TAS, IAS) is greater than the difference DIFF, then the method is initiated by the processor unit.

During an initialization step, the processor unit can initialize a counter COUNT to a value zero.

At the end of the preliminary step STP1, the processor unit can begin a selection step STP2.

Under such circumstances, the processor unit 15 determines whether each of the criteria 50 stored in its memory unit is satisfied. In particular, at least a first criterion 51 and a second criterion 52 need to be satisfied.

Thus, the processor unit determines whether a first criterion 51 is satisfied. This first criterion is satisfied if a time derivative $$\frac{d\eta}{dt}$$

of said angle η is positive, i.e. if $$\frac{d\eta}{dt} > 0.$$

Optionally, the first criterion 51 is satisfied if the time derivative $$\frac{d\eta}{dt}$$

of said angle η is greater than a non-zero positive constant K for a predetermined duration D, i.e.:

$$\frac{d\eta}{dt} > K > 0$$

for a predetermined duration D.

The processor unit also determines whether a second criterion 52 is satisfied. This second criterion 52 is satisfied if a time derivative $$\frac{dVt}{dt}$$

of the path speed Vt is negative, i.e.:

$$\frac{dVt}{dt} < 0.$$

The processor unit optionally also determines whether a third criterion 53 is satisfied. The third criterion is satisfied if the current vertical speed Vv is positive, i.e.: Vv>0.

If each criterion is satisfied, the branch Y1 is followed by the processor unit.

Under such circumstances, the processor unit determines the calculation speed vector by applying the above-explained correction stage. The calculation speed vector is then not equal to the current speed vector. By way of example, the rotorcraft may be in such a situation at the above-mentioned second point Pt2.

Furthermore, the counter COUNT takes the value 1 by way of example to indicate that the correction stage has been performed in this iteration.

If at least one criterion is not satisfied, then the branch N1 is followed by the processor unit.

Under such circumstances, the processor unit determines whether each of the conditions 60 stored in its memory unit is satisfied.

A first condition 61 is satisfied if a time derivative $$\frac{dVt}{dt}$$

of the path speed Vt is negative, i.e.

$$\frac{dVt}{dt} < 0.$$

An optional second condition 62 is satisfied if a current vertical speed Vv relative to the ground is positive, i.e. Vv>0.

If each condition 60 is satisfied, the branch Y2 is followed by the processor unit.

Under such circumstances, during an analysis stage STP5, the processor unit determines whether the correction stage was performed at the preceding calculation iteration. For this purpose, the processor unit determines the value of the counter COUNT.

If the correction stage was performed at the preceding calculation iteration, the counter COUNT will be equal to one. If it is, the processor unit then performs the correction stage STP3 in order to determine the calculation speed vector Vect1.

If not, if the correction stage was not performed at the preceding calculation iteration, then the counter COUNT will be equal to zero.

The processor unit then performs the non-corrected stage STP6 in order to determine the calculation speed vector Vect1.

In this non-corrected stage, the processor unit gives the horizontal component V1 of the calculation speed vector the value of the current horizontal speed Vh.

In contrast, the processor unit gives the vertical component V2 the value of the current vertical speed of the rotorcraft 1.

Furthermore, if at least one condition is not satisfied, the branch N2 is followed by the processor unit.

The processor unit then applies the non-corrected stage STP6 and re-initializes the counter COUNT to the value zero.

Naturally, the present invention may be subjected to numerous variations and to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A piloting assistance method for avoiding an obstacle with a rotorcraft flying along a current speed vector (Vect0), an alert being generated by an alert unit of an avionics equipment of the rotorcraft if an obstacle might be impacted by the rotorcraft, wherein a processor of the avionics equipment of the rotorcraft controls the alert unit to generate the alert by using a speed vector of the rotorcraft referred to as a "calculation" speed vector (Vect1) for the processor to determine whether the rotorcraft might impact an obstacle, and during a correction stage (STP3) and at each calculation iteration, the calculation speed vector (Vect1) is determined by the processor using a horizontal component (V1) of the calculation speed vector in a horizontal plane (P1) orthogonal to gravity direction (AX), as determined by the processor, and a vertical component (V2) of the calculation speed vector along the gravity direction (AX), as determined by the processor, the vertical component (V2) being a function of a current vertical speed (Vv) of the rotorcraft relative to the ground, as determined by an inertial unit of the rotorcraft connected to the processor, at the calculation instant corrected with a corrective term (Vvp), the corrective term (Vvp) being a function of a product of a current path speed (Vt) of the rotorcraft, as determined by the inertial unit, multiplied by the derivative of the path speed.

2. The piloting assistance method according to claim 1, wherein the horizontal component (V1) is equal to a current horizontal speed (Vh) of the rotorcraft relative to the ground.

3. The piloting assistance method according to claim 1, wherein the vertical component (V2) is determined by the processor using the following relationship:
with $$V2 = Vv + Vvp \text{ with}$$
$$Vvp = B * \frac{Vt}{g} * \frac{dVt}{dt}$$

where "V2" represents the vertical component, "Vv" represents the current vertical speed relative to the ground, "Vvp" represents the corrective term, "B" represents a constant, "Vt" represents the current path speed, $$\text{"}\frac{dVt}{dt}\text{"}$$

represents the derivative of the path speed, "g" represents the acceleration due to gravity, "*" represents the multiplication sign, and "+" represents the addition sign.

4. The piloting assistance method according to claim 3, wherein constant (B) is less than or equal to 1.

5. The piloting assistance method according to claim 1, wherein the method is initiated when the air speed (TAS, IAS) of the rotorcraft, as detected by an air data computer of the rotorcraft connected to the processor, is greater than a difference between a best rate of climb (Vy) and a margin (Vm).

6. The piloting assistance method according to claim 5, wherein the margin (Vm) is less than or equal to 20 knots.

7. A piloting assistance method for avoiding an obstacle with a rotorcraft flying along a current speed vector (Vect0), an alert being generated by an alert unit of an avionics equipment of the rotorcraft if an obstacle might be impacted by the rotorcraft, wherein a processor of the avionics equipment of the rotorcraft controls the alert unit to generate the alert by using a speed vector of the rotorcraft referred to as a "calculation" speed vector (Vect1) for the processor to determine whether the rotorcraft might impact an obstacle, and during a correction stage (STP3) and at each calculation iteration, the calculation speed vector (Vect1) is determined by the processor using a horizontal component (V1) of the calculation speed vector in a horizontal plane (P1) orthogonal to gravity direction (AX), as determined by the processor, and a vertical component (V2) of the calculation speed vector along the gravity direction (AX), as determined by the processor, the vertical component (V2) being a function of a current vertical speed (Vv) of the rotorcraft relative to the ground, as determined by an inertial unit of the rotorcraft connected to the processor, at the calculation instant corrected with a corrective term (Vvp), the corrective term (Vvp) being a function of a product of a current path speed (Vt) of the rotorcraft, as determined by the inertial unit, multiplied by the derivative of the path speed;
wherein the current speed vector (Vect0) presents an angle (η) relative to the horizontal plane (P1) and the correction stage is performed by the processor if a plurality of criteria is satisfied, the plurality of criteria comprising at least:
a first criterion that is satisfied if a time derivative of the angle (η) is positive; and
a second criterion that is satisfied if a time derivative of the path speed (Vt) is negative.

8. The piloting assistance method according to claim 7, wherein the first criterion is satisfied if the time derivative of the angle (η) is greater than a non-zero constant (K).

9. The piloting assistance method according to claim 7, wherein the plurality of criteria includes a third criterion, the third criterion being satisfied if the current vertical speed (Vv) is positive.

10. The piloting assistance method according to claim 7, wherein if at least one criterion is not satisfied, it is determined by the processor whether at least one condition is satisfied, the at least one condition comprising a first condition that is satisfied if a time derivative of the path speed (Vt) is negative, and if each condition is satisfied:
if the correction stage (STP3) was implemented in the calculation iteration preceding the current calculation iteration, then the correction stage (STP3) is implemented during the current calculation iteration; and
if the correction stage (STP3) was not implemented in the calculation iteration preceding the current calculation iteration, then a non-corrected stage (STP6) is implemented, during which non-corrected stage and on each calculation iteration the calculation speed vector (Vect1) is determined using the horizontal component (V1) and a vertical component (V2) equal to the current vertical speed of the rotorcraft.

11. The piloting assistance method according to claim 10, wherein the at least one condition includes a second condition that is satisfied if a current vertical speed (Vv) is positive.

12. The piloting assistance method according to claim 10, wherein if at least one condition is not satisfied, the non-corrected stage (STP6) is implemented.

13. The piloting assistance method according to claim 10, wherein the alert comprises an alarm telling a pilot to change a collective pitch of blades of a rotor of the rotorcraft that is contributing at least to providing the rotorcraft with lift.

14. The piloting assistance method according to claim 10, wherein an avoidance path including at least a proximal segment is determined by the processor, the proximal segment extending in a direction followed by the calculation speed vector (Vect1).

15. A piloting assistance system for avoiding an obstacle with a rotorcraft flying along a current speed vector (Vect0), comprising:
an alert unit of an avionics equipment to generate an alert if an obstacle might be impacted by the rotorcraft;
a processor of the avionics equipment controls the alert unit to generate the alert by using a speed vector of the rotorcraft referred to as a "calculation" speed vector (Vect1) for the processor to determine whether the rotorcraft might impact an obstacle;

an inertial unit connected to the processor, the inertial unit to determine a current vertical speed (Vv) of the rotorcraft relative to the ground and to determine a current path speed (Vt) of the rotorcraft; and wherein during a correction stage (STP3) and at each calculation iteration, the processor determines the calculation speed vector (Vect1) using a horizontal component (V1) of the calculation speed vector in a horizontal plane (P1) orthogonal to gravity direction (AX), as determined by the processor, and a vertical component (V2) of the calculation speed vector along the gravity direction (AX), as determined by the processor, the vertical component (V2) being a function of the current vertical speed (Vv) of the rotorcraft relative to the ground at the calculation instant corrected with a corrective term (Vvp), the corrective term (Vvp) being a function of a product of the current path speed (Vt) of the rotorcraft multiplied by the derivative of the path speed.

16. The piloting assistance system according to claim 15, wherein the locator system comprises at least one of the following pieces of equipment: an obstacle database listing obstacles, and an obstacle detection system.

17. The piloting assistance system according to claim 15, wherein the speed measurement system comprises at least one of the following pieces of equipment: an inertial unit, an air data computer, an accelerometer.

18. A rotorcraft, wherein the rotorcraft includes a piloting assistance system according to claim 15.

* * * * *